United States Patent
Vigliotta

(10) Patent No.: US 11,122,782 B1
(45) Date of Patent: Sep. 21, 2021

(54) SYSTEM FOR CULTIVATING OYSTERS

(71) Applicant: John Vigliotta, Gloucester, VA (US)

(72) Inventor: John Vigliotta, Gloucester, VA (US)

( * ) Notice: Subject to any disclaimer, the term of this patent is extended or adjusted under 35 U.S.C. 154(b) by 67 days.

(21) Appl. No.: 16/702,701

(22) Filed: Dec. 4, 2019

(51) Int. Cl.
*A01K 61/54* (2017.01)
*A01K 61/55* (2017.01)
*A01K 61/60* (2017.01)
*A01K 61/65* (2017.01)

(52) U.S. Cl.
CPC .............. *A01K 61/55* (2017.01); *A01K 61/54* (2017.01); *A01K 61/60* (2017.01); *A01K 61/65* (2017.01)

(58) Field of Classification Search
CPC ........ A01K 61/54; A01K 61/55; A01K 61/60; A01K 61/65
USPC .................................. 119/234, 236, 238–241
See application file for complete search history.

(56) References Cited

U.S. PATENT DOCUMENTS

| | | | | |
|---|---|---|---|---|
| 2,989,945 A * | 6/1961 | Ford | .................. | A01K 61/59 119/240 |
| 3,650,244 A * | 3/1972 | Fordham | .................. | A01K 61/54 119/237 |
| 3,702,599 A * | 11/1972 | Herolzer | .................. | A01K 61/54 119/241 |
| 4,266,509 A * | 5/1981 | Gollott | .................. | A01K 61/54 119/208 |
| 4,766,846 A * | 8/1988 | Lavoie | .................. | A01K 61/54 119/240 |
| 5,269,254 A * | 12/1993 | Gagliano | .................. | A01K 61/54 119/237 |
| 5,628,280 A * | 5/1997 | Ericsson | .................. | A01K 61/54 119/239 |
| 10,357,023 B2 * | 7/2019 | DePaola | .................. | A01K 61/50 |
| 2007/0068462 A1 * | 3/2007 | de Vries | .................. | A01K 61/60 119/240 |
| 2010/0018471 A1 | 1/2010 | Murdza | | |
| 2011/0265730 A1 | 11/2011 | Farrington | | |

* cited by examiner

*Primary Examiner* — David J Parsley
(74) *Attorney, Agent, or Firm* — Sanchelima & Associates PA; Christian Sanchelima

(57) ABSTRACT

A system for cultivating a large quantity of oysters is disclosed herein. The system includes a device that can be placed either on the seabed or the surface of a water environment. The device may be placed at either location and may also be placed further offshore and still be safe from extreme weather conditions. As a result, the benefits of each location are implemented into the system. The system includes an oyster cultivating device including a rectangular frame holding various crates with multiple internal baffles or dividers, and an attached buoyant member for keeping the cultivating frame at or near the surface of the water. The crates are placed such that they fill the volume within the rectangular frame. A buoyant member is then placed on the top end of the rectangular frame. The system provides increased agitation capabilities for oysters to provide a larger and rounder cultivated oyster.

11 Claims, 8 Drawing Sheets

SYSTEM FOR CULTIVATING OYSTERS

BACKGROUND OF THE INVENTION

1. Field of the Invention

The present invention relates to the field of cultivators and, more particularly, to a system for cultivating oysters.

2. Description of the Related Art

Several designs for a system for cultivating oysters have been designed in the past. None of them, however, include an oyster cultivating device comprising a rectangular frame with multiple internal baffles or dividers, and an attached buoyant member for keeping the cultivating frame at or near the surface of the water. It is known that individuals often cultivate oysters to then sell for profit. It is also known that the current methods for cultivating oysters involving placing a plurality of small structures in shallow waters nearby individuals' private homes. This current method is a hindrance to individuals' private property. Therefore, there is a need for a system for cultivating oysters that does not intrude on the private homes of individuals while providing a larger and rounder cultivated oyster.

Applicant believes that a related reference corresponds to U.S. patent (published application) No. 2011/0265730 issued for an apparatus for the cultivation of molluscan shellfish and other marine species. Applicant believes that another reference relates to U.S. patent application 2010/0018471 issued for a method and apparatus for growing oysters. However, the references differ from the present invention because they fail to disclose an oyster cultivating device comprising a rectangular frame with multiple internal baffles or dividers, and an attached buoyant member for keeping the cultivating frame at or near the surface of the water. The present invention addresses these issues by providing a rectangular frame with crates used to cultivate oysters. The present invention allows a user to cultivate a large volume of oysters while saving space. Additionally, one of the novel benefits of the present invention is that it can be placed either on the seabed or the surface. The present invention may be placed at either location and may also be placed further offshore and still be safe from weather issues. As a result, the benefits of each method are implemented into the present invention. Furthermore, the present invention addresses the need of producing a higher volume of oysters. The present invention also addresses the heartfelt issue of not placing oyster cages near individual's private property which is currently an issue throughout the United States.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a system for cultivating oysters that provides a method for cultivating oysters further off shore in deeper water away from people's homes.

It is another object of this invention to provide a system for cultivating oysters that provides increased agitation capabilities to produce a rounder and deeper cupped cultivated oyster.

It is still another object of the present invention to provide a system for cultivating oysters that includes a buoyant member to cover the top end of a rectangular frame to prevent the oysters from being contaminated by bird feces.

It is still another object of the present invention to provide a system for cultivating oysters that is able to sink below sea level to provide protection against harsh weather conditions.

It is still another object of the present invention to provide a system for cultivating oysters that may be placed on the seabed or on the surface further off shore thereby obtaining the benefits of each method.

It is still another object of the present invention to provide a system for cultivating oysters that addresses the issue of cultivating a higher volume of oysters.

It is yet another object of this invention to provide such a device that is less expensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
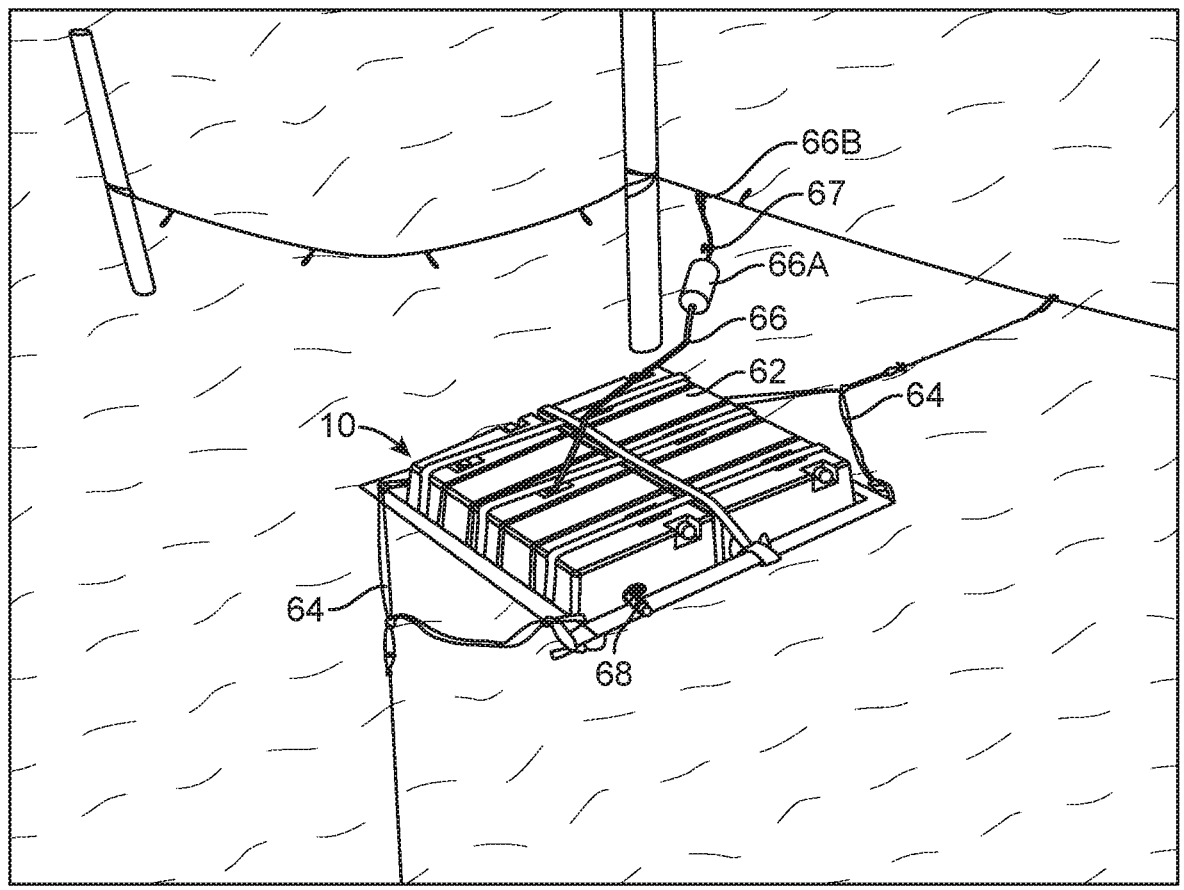
FIG. 1 represents an isometric view of a system for cultivating oysters 10 in its operating environment in accordance to an embodiment of the present invention.
Figure 2:
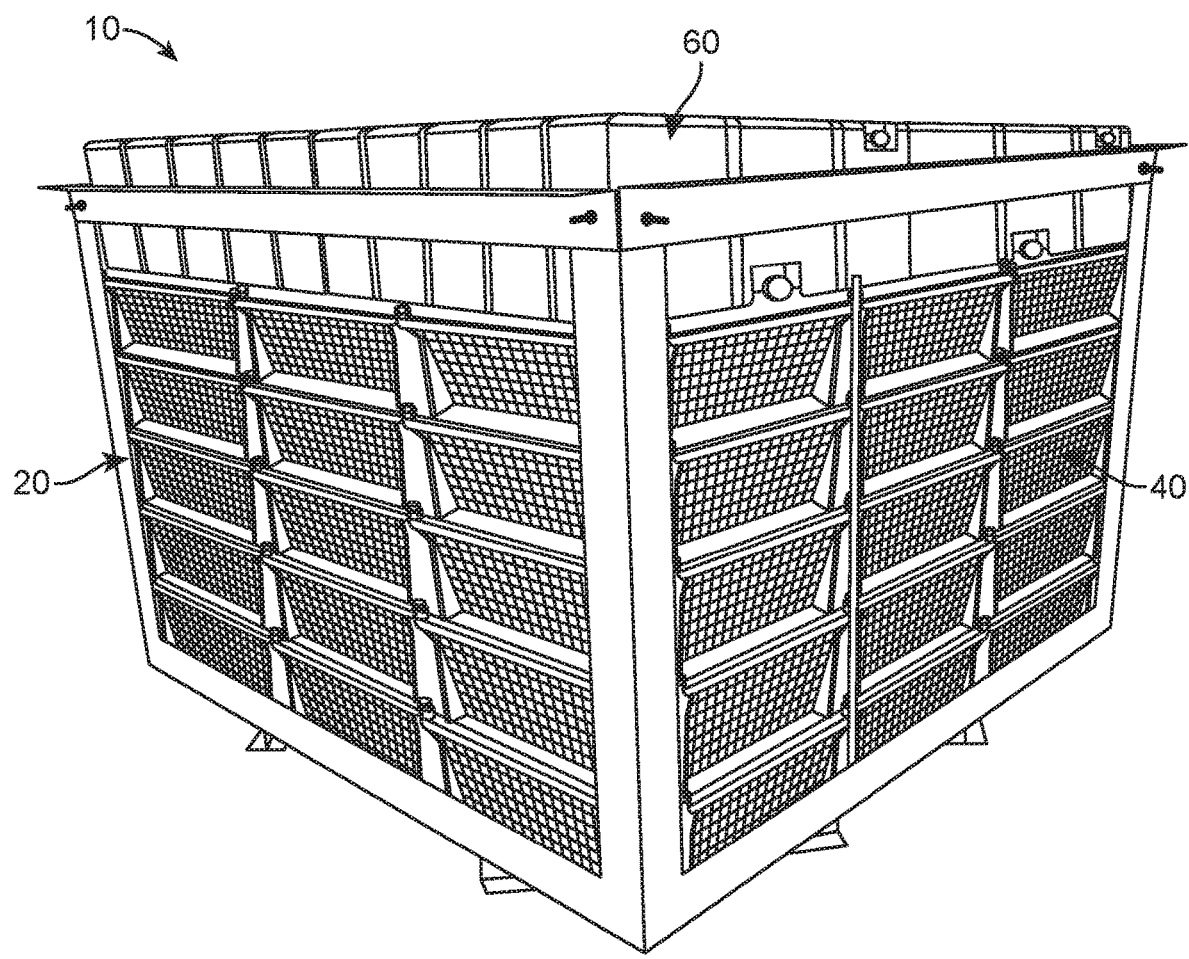
FIG. 2 shows another isometric view of a system for cultivating oysters 10 in accordance to an embodiment of the present invention.
Figure 3:
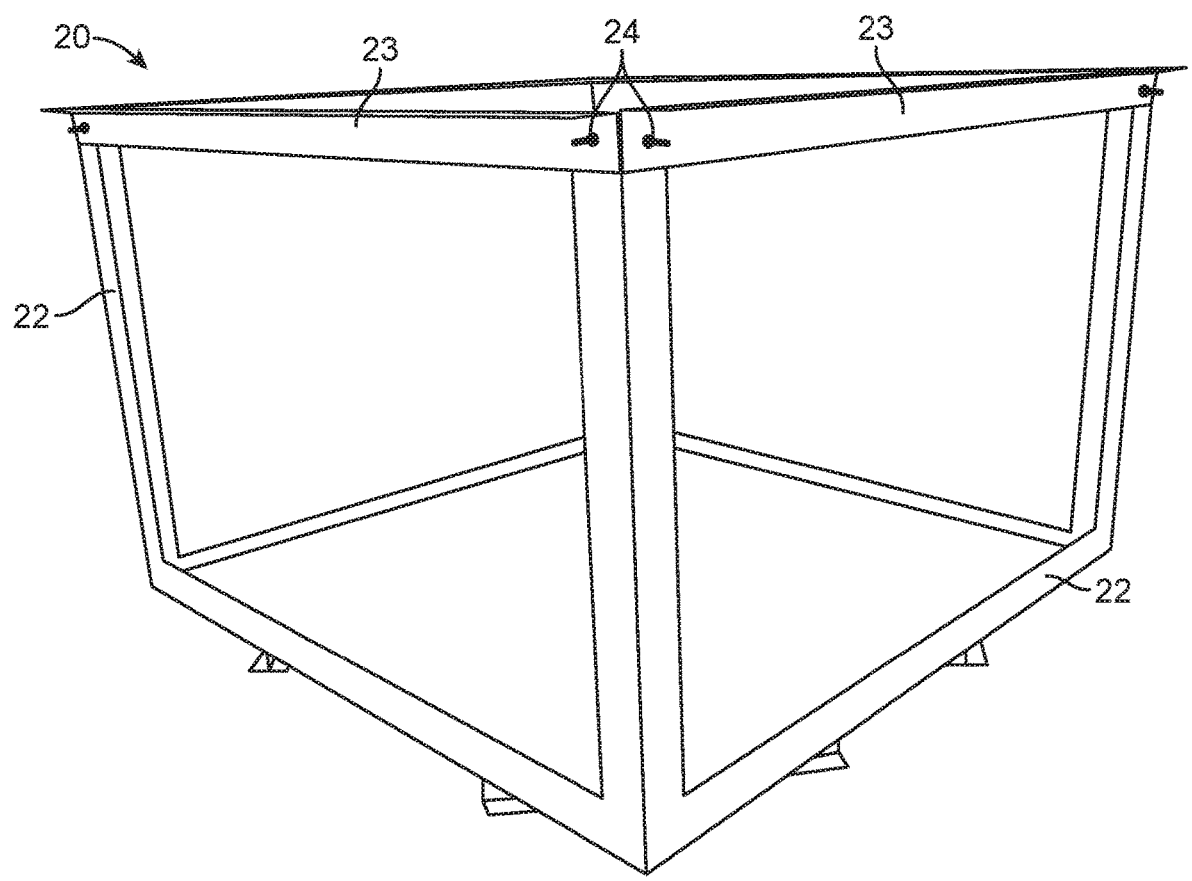
FIG. 3 illustrates an isometric view of a frame assembly 20 in accordance to an embodiment of the present invention.
Figure 4:
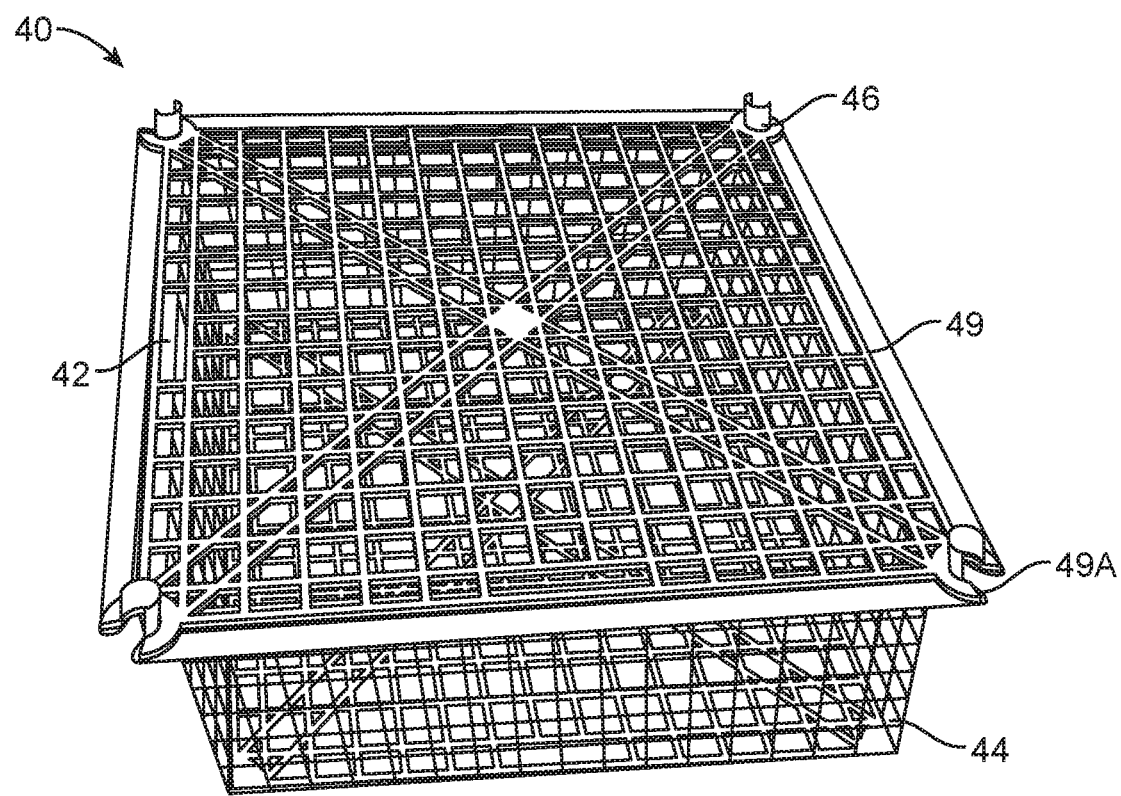
FIG. 4 is a representation of an isometric view of a single crate of crate assembly 40 in accordance to an embodiment of the present invention.
Figure 5:
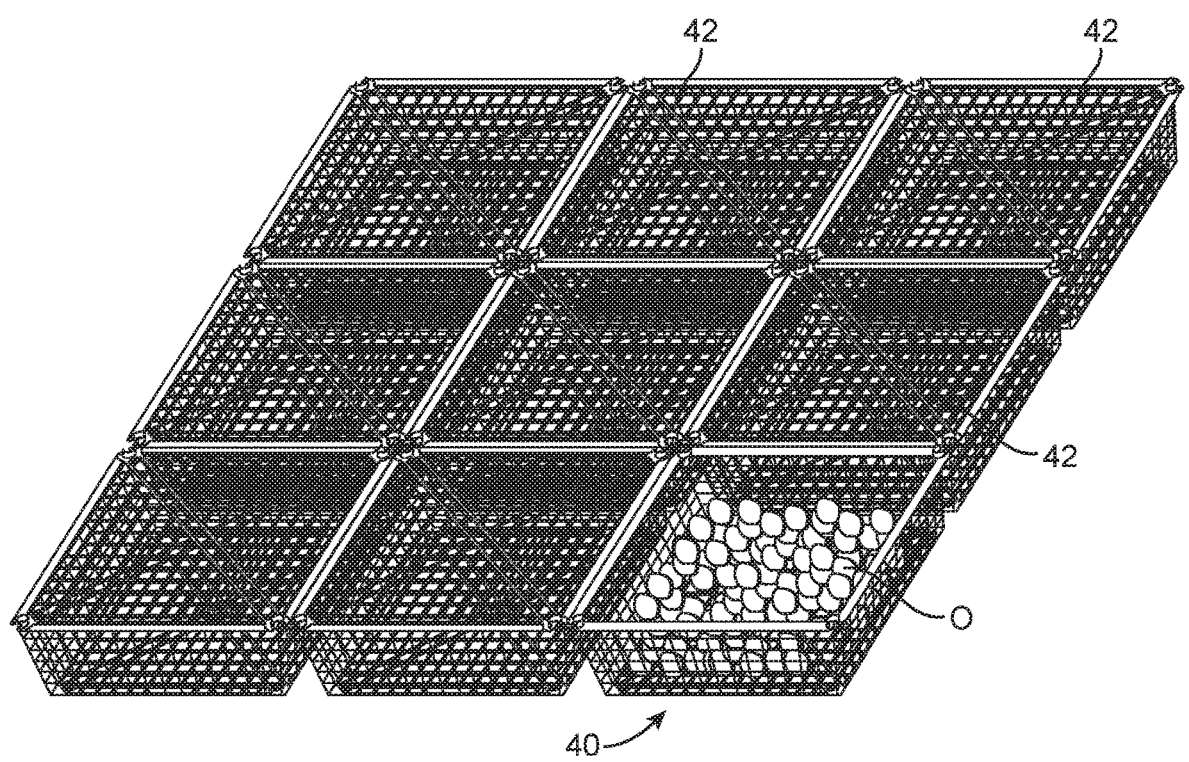
FIG. 5 shows an isometric view of crate assembly 40 in accordance to an embodiment of the present invention.
Figure 6:
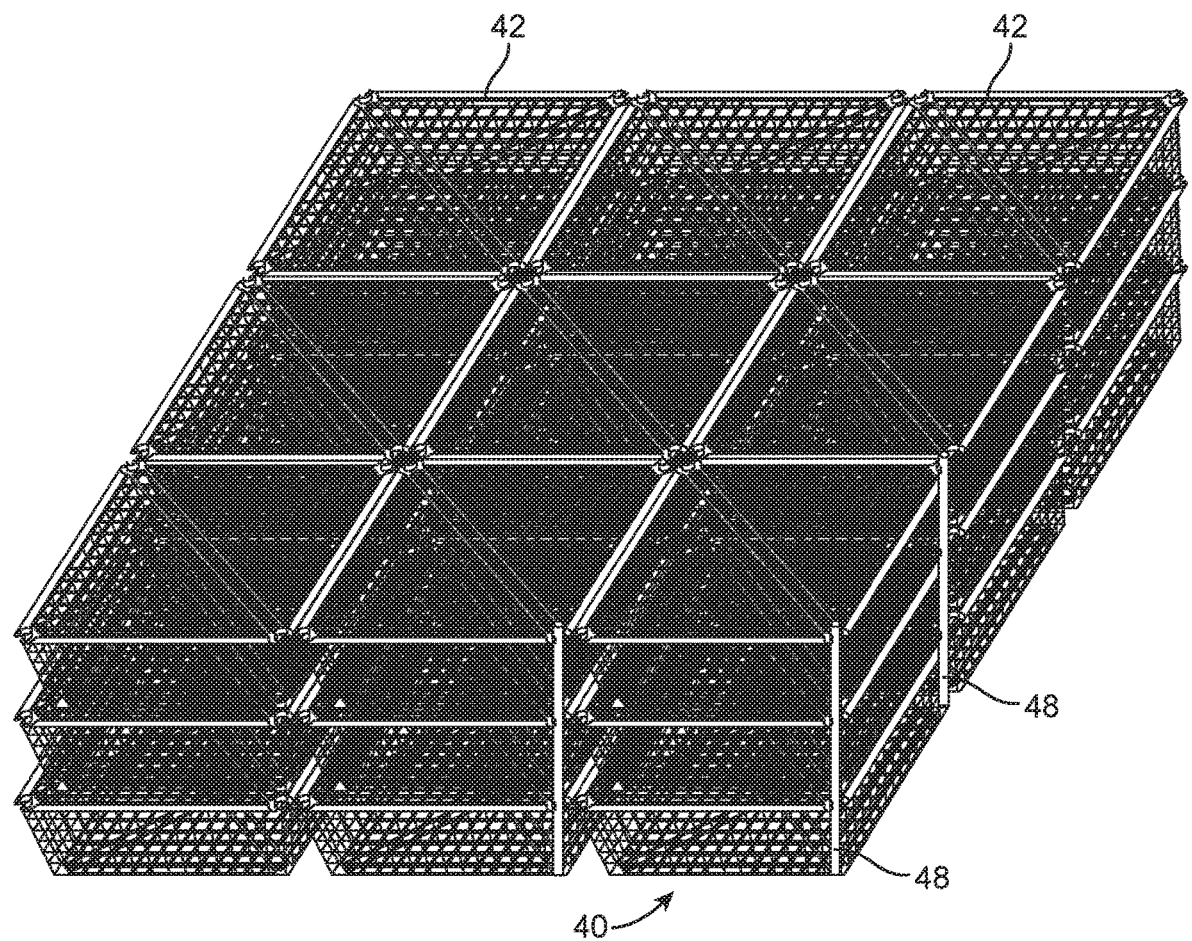
FIG. 6 illustrates another isometric view of crate assembly 40 having elongated rod 48 mounted thereon in accordance to an embodiment of the present invention.
Figure 7:
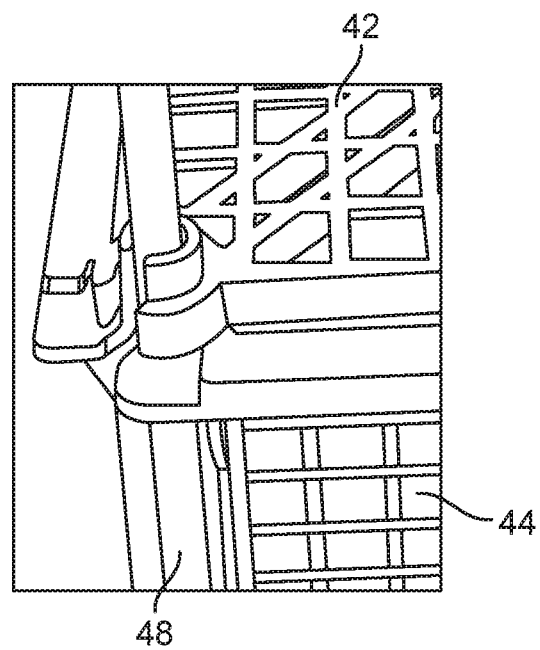
FIG. 7 is a representation of an enlarged view of crate assembly 40 in accordance to an embodiment of the present invention.
Figure 8:
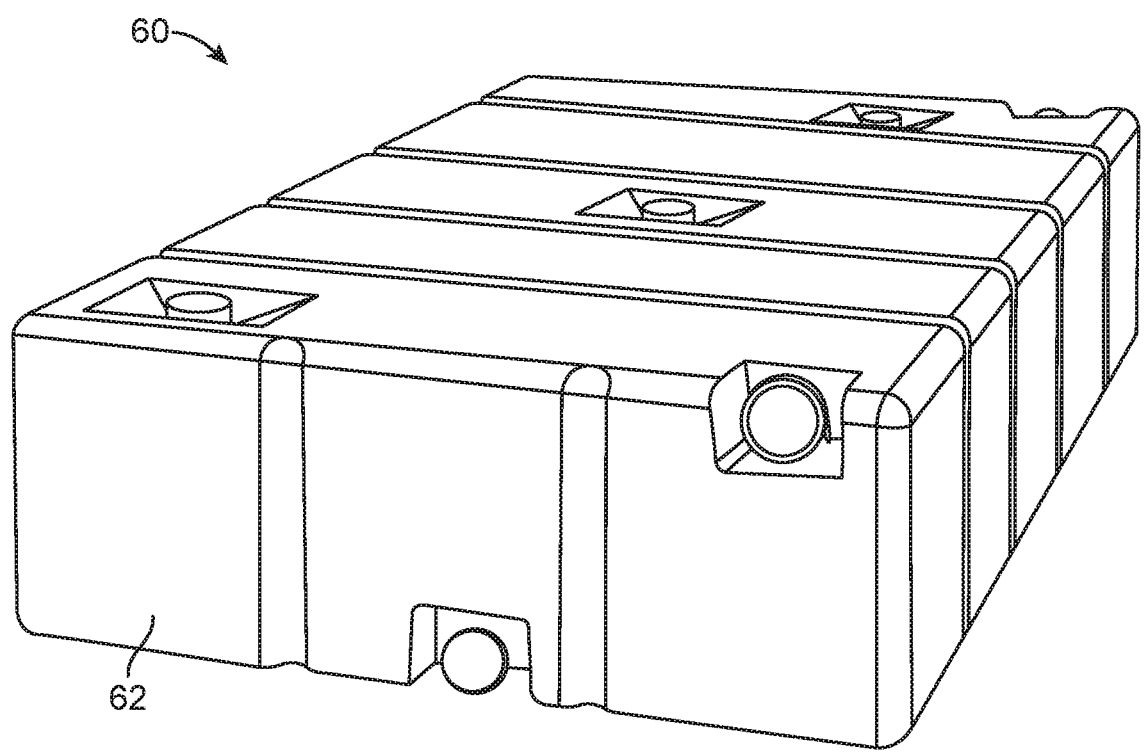
FIG. 8 shows an isometric view of buoyant assembly 60 in accordance to an embodiment of the present invention.
Figure 9:
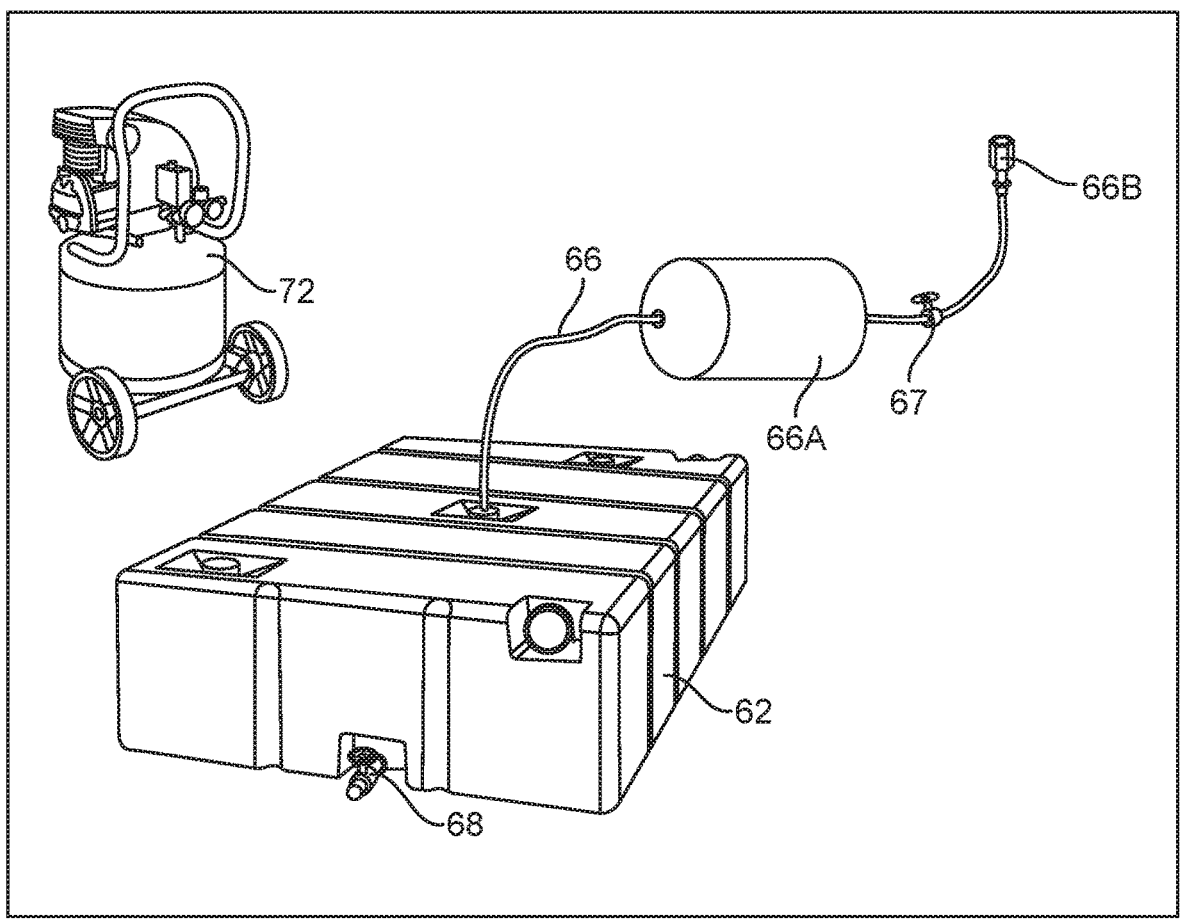
FIG. 9 shows another isometric view of buoyant assembly 60 having hose 66 mounted thereon in accordance to an embodiment of the present invention.

Referring now to the drawings, where the present invention is generally referred to with numeral 10, it can be observed a system for cultivating oysters 10 including a frame assembly 20, a crate assembly 40, and a buoyant assembly 60.

Frame assembly 20 includes angle bars 22. In an embodiment of the present invention angle bars 22 are mounted in such a configuration to define a space 21 of a rectangular cuboid. Angle bars 22 may be comprised of a metallic material such as but not limited to aluminum, and other metals. Preferably, angle bars 22 are made of a material to withstand a substantial amount of time within sea water. Additionally, angle bars 22 are mounted in such a way that angle bars 22 define edges 23 of frame assembly 20. It should be understood that other suitable shapes may be provided for frame assembly 20 and is not limited to being that of a rectangular cuboid. In an embodiment of the present invention, angle bars 22 are mounted to one another using a combination of threaded fasteners 24 or welding. Threaded fasteners 24 are screws mounted to each end of angle bars 22. Frame assembly 20 is of a large volume and thereby addresses the issue of being able to cultivate a large scale of oysters.

Crate assembly 40 includes crates 42. In an embodiment of the present invention crates 42 are mounted vertically and horizontally to define space 21 of frame assembly 20. In one embodiment, crates 42 may be mounted in a three by three by five configurations for a total of forty-five crates. It should be understood that any suitable configuration may be used to fill the space 21 using crates 42. Crates 42 may be made of any suitable material to withstand long periods of time within the sea. This may include materials such as plastic, metal, and the like. In the present invention 10 crates 42 are each filled with a substantial number of oysters O to be cultivated. Crates 42 includes holes 44 thereon. Holes 44 are of a size that do not allow oysters O to fall out of crates 42. Additionally, holes 44 allow sea water to pass through crates 42 to create increased agitation on oysters O. Crates 42 additionally include a vertical locking member 46 mounted to each corner of crates 42 to receive and elongated rod 48 therein. Vertical locking member 46 may be a C-shaped tube that receives elongated rod 48. Elongated rod 48 may be any elongated rod of a suitable cylindrical shape to fit therein vertical locking member 46. Elongated rod 48 may be of a cylindrical PVC material that extends the entire length of the stacked crates 42. Elongated rod 48 secures crates 42 in a vertical position. Additionally, crates 42 includes covers 49 to be mounted to a top end of crates 42. Covers 49 may be of a rectangular shape that cooperates with the shape of crates 42. Covers 49 may include a lock receiving member 49A mounted to each corner of covers 49. Lock receiving member 49A is a C-shaped tube that is larger than vertical locking member 46. Additionally, lock receiving member 49A is mounted to an outer portion of vertical locking member 46. A large number of crates 42 may be inserted within frame assembly 20 and as a result further addresses the issue of producing a large scale of oysters O. A user may insert a large number of oysters O to be cultivated which thereby increases the profit of a user.

Buoyant assembly 60 includes a buoyant member 62 mounted to a top end of frame assembly 20. In an embodiment of the present invention, buoyant member 62 comprises a rectangular shape that cooperates with the shape of frame assembly 20. Buoyant member 62 is made of a buoyant material to float on sea water. In the present embodiment, frame assembly 20 having crate assembly 40 and buoyant assembly 60 thereon is placed in an sea environment. Buoyant member 62 may be secured to said frame assembly 40 using straps 64 or any other method of securing flotation to the device. Additionally, buoyant member 62 keeps frame assembly 20 near the surface of the sea. Buoyant assembly 60 further includes a hose 66 mounted on a top end of buoyant member 62. Hose 66 may be any suitable hose to withstand air pressure such as but not limited to a twenty-foot clear PVC tubing. Hose 66 may further include a buoy 66A mounted near an end of hose 66. Additionally, an open end of hose 66 further includes an air hose connector 66B mounted thereon. Hose 66 may further include a first gate valve 67 located near an end of hose 66 next to buoy 66A. Furthermore, a second gate valve 68 may be mounted on a bottom end of a sidewall of buoyant member 62. In one embodiment, a user opens both gate valves 67 and 68 to then allow seawater to enter buoyant member 62 through gate valve 68 therein. Buoyant member 62 then fills with water to then allow buoyant member 62 to sink to the seabed. This configuration allows system for cultivating oysters 10 to be protected from harsh weather conditions. Additionally, when the system is ready to be brought back to the surface of the sea, a user may then attach hose 66 to an air compressor 72. Air compressor 72 may then be actuated to then fill buoyant member 62 with air to then allow buoyant member 62 to then rise to the surface of the sea then closing gate valves 67 and 68. System for cultivating oysters 10 may be placed in a sea environment which allows oysters O to be cultivated at the surface for maximum growth in a non-invasive method away from people's homes. Additionally, system for cultivating oysters 10 provides increased agitation capabilities to cultivate rounder and deeper cupped oyster O.

The present invention includes superior benefits for a user in that it allows the user to place system for cultivating oysters on the seabed and on the surface. These are currently the two known methods for cultivating oysters each having their own advantages and disadvantages. System for cultivating oysters 10 is adapted to be placed on either the seabed or further off shore and as a results gains the benefits of each of the methods currently used. Furthermore, the present invention addresses the issue of being able to cultivate a higher volume of oysters within a system. More importantly, the present invention addresses the issue of being able to effectively cultivate oysters far away from individual's private property. This is a well-known issue that the invention resolves effectively and efficiently.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for cultivating oysters, comprising:
   a. a frame assembly, including angle bars mounted to define the space of a rectangular cuboid, wherein said angle bars define edges of said rectangular cuboid;
   b. a crate assembly, including crates being adjacently mounted vertically and horizontally to occupy the space within said frame assembly, wherein said crates are filled with oysters to be cultivated therein, wherein said crates include holes to allow the flow of water therein, wherein said crates include a vertical locking member disposed on each corner of said crates to receive an elongated rod therein, wherein said elongated rod secures said crates in a vertical position, wherein said crates include covers to be mounted to a top end of said crates; and
   c. a buoyant assembly, including a buoyant member mounted to a top end of said frame assembly, wherein said buoyant member comprises a rectangular shape that cooperates with the shape of said frame assembly, wherein said buoyant assembly further includes a hose having a first end mounted to a top end of said buoyant member, wherein said hose further includes a buoy and a first gate valve located near a second end of said hose, wherein said hose further includes an air hose connecter located at said second end of said hose, wherein said buoyant assembly further includes a second gate valve located on a bottom end of a sidewall of said buoyant member.

2. The system for cultivating oysters of claim 1 wherein said vertical locking member is a C-shaped tube that receives said elongated rod therein.

3. The system for cultivating oysters of claim 1 wherein said covers include a lock receiving member disposed on each corner of said covers.

4. The system for cultivating oysters of claim 3 wherein said lock receiving member is a C-shaped tube larger than said vertical locking member.

5. The system for cultivating oysters of claim 1 wherein said frame assembly having said crate assembly and said buoyant assembly mounted thereon is placed in the sea and secured using straps.

6. The system for cultivating oysters of claim 1 wherein a user opens said first gate valve and said second gate valve to configure said buoyant member to fill with seawater to then be lowered to a seabed.

7. The system for cultivating oysters of claim 1 wherein a user connects said hose to an air compressor, wherein said air compressor is then actuated to then fill said buoyant member with air to then configure said buoyant member to raise to the surface of the sea, then closing said second gate valve to prevent water from entering therein.

8. The system for cultivating oysters of claim 1 wherein said angle bars are made of a metallic material.

9. The system for cultivating oysters of claim 1 wherein said angle bars are mounted to each other using threaded fasteners or welding.

10. The system for cultivating oysters of claim 1 wherein said buoyant member keeps said frame assembly near the surface of the sea.

11. A system for cultivating oysters, comprising:
  a. a frame assembly, including angle bars mounted to define the space of a cube, wherein said angle bars define edges of said cube, wherein said angle bars are made of a metallic material, wherein said angle bars are secured to one another using threaded fasteners and welding;
  b. a crate assembly, including forty-five crates being adjacently mounted vertically and horizontally to occupy the space within said frame assembly, wherein said forty-five crates are filled with oysters to be cultivated therein, wherein said forty-five crates fill up the space of said frame assembly, wherein said forty-five crates includes holes to allow the flow of water therein, wherein said forty-five crates include a vertical locking member disposed on each corner of said forty-five crates to receive an elongated rod therein, wherein said elongated rod secures said forty-five crates in a vertical position, wherein said forty-five crates include covers to be mounted to a top end of said forty-five crates, wherein said vertical locking member includes a substantially C-shaped cylindrical member to receive said elongated rod; and
  c. a buoyant assembly, including a buoyant member mounted to a top end of said frame assembly, wherein said buoyant member comprises a rectangular shape that cooperates with the shape of said frame assembly, wherein said buoyant assembly further includes straps to secure said buoyant member to said frame assembly, wherein said buoyant assembly further includes a hose having a first end mounted to a top end of said buoyant member, wherein said hose further includes a buoy and a first gate valve located near a second end of said hose, wherein said hose further includes an air hose connecter located at said second end of said hose, wherein said buoyant assembly further includes a second gate valve located on a bottom end of a sidewall of said buoyant member.

\* \* \* \* \*